Patented June 15, 1954

2,681,357

UNITED STATES PATENT OFFICE 2,681,357

PROCESS FOR PRODUCING A WAX OXIDATE

John K. McKinley, Port Arthur, Tex., assignor to The Texas Company, New York, N. Y., a corporation of Delaware No Drawing. Application June 7, 1951, Serial No. 230,419

6 Claims. (Cl. 260—451)

This invention relates to a method for oxidizing high molecular weight paraffins to produce an oxidate which contains a high ester content and which is characterized by exceptional solubility in mineral oils. The wax oxidates produced by the process of this invention are particularly useful as an additive in the production of specialty lubricants to which they impart good emulsibility, oiliness and non-corrosive properties.

Oxidation of high molecular weight hydrocarbons with air of oxygen results in the production of a heterogeneous mixture of oxygenated compounds. Not only are many different types of oxygenated hydrocarbons produced, but oxygenates of a wide molecular weight range result because the oxidation is accompanied by substantial chain degradation even when a relatively close boiling charge material is employed. The complexity of the oxidation product is apparent from a brief review of the types of oxygenates obtained. Acids, alcohols, aldehydes and ketones are all produced directly in the oxidation reaction. At the oxidation temperatures ordinarily employed, which are in the range of 200 to 400° F., a number of secondary reaction products are formed; in particular, there is a substantial amount of thermal esterification of organic acids with hydroxy acids and with alcoholic components of the reaction mixture.

Despite the extensive nature of the prior art on wax oxidation, the technical and patent literature are deficient in teaching how to control the oxidation of a paraffin wax to produce an oxidate characterized by high ester content and good mineral oil solubility. The solubility of prior art oxidates in paraffin base oils has been particularly poor. While high ester content oxidates have been produced by prior art processes, they uniformly have possessed low solubility in paraffinic mineral oils, which has been a serious detriment to their use as lube oil additives. The subject application provides a method for producing a high ester content oxidate which is soluble in both naphthenic and paraffinic mineral oils. The resulting oxidates impart corrosion resistance, oiliness and emulsibility to mineral oil compositions.

In accordance with the process of this invention, a wax oxidate of high ester content and good solubility in oils is obtained by reacting a deoiled paraffin with air in the absence of a catalyst at an air feed rate of 5 to 20 cubic feet per pound of paraffin per hour, at a temperature between 360 and 390° F. and at atmospheric pressure. The critical features are charge material, absence of a catalyst, maintenance of prescribed pressure and temperature conditions, and utilization of an air rate in the prescribed region. Using the prescribed conditions, there are obtained in about 3 hours wax oxidates which have a ratio of Neut. No. to Sap. No. less than 0.25, which are highly soluble in mineral oils and which impart oiliness, emulsibility and non-corrosiveness to oil compositions in which they are incorporated.

The selection of charge material has a significant and substantial effect on the type of oxidate produced. A deoiled paraffin wax such as may be produced by solvent dewaxing of a paraffin base crude is a preferred charge material for production of a high ester content oxidate. In general, it is advisable that the oil content of the charge wax be less than 5 per cent. A paraffinic wax containing less than 5 per cent oil is readily available as a by-product of the manufacture of low-pour lubricating oils. A preferred charge material is the wax obtained by solvent dewaxing a distillate oil. Crude scale wax containing less than 5 per cent oil and obtained by pressing and sweating a distillate oil may also be used as a charge wax. The wax obtained in lubricating oil manufacture by a combination of extractive solvent refining, employing solvents such as furfural, phenol, chlorex, etc., and of solvent dewaxing, is a preferred charge stock.

The production of highly soluble, high ester content wax oxidate is effected non-catalytically in an aluminum-lined reactor. Non-catalytic oxidation of the deoiled paraffin wax under the conditions described in this invention produces in a relatively short period of about 3 hours an oxidate having a Sap. No. of about 80 and a ratio of Neut. No. to Sap. No. less than 0.20.

During the oxidation, the temperature must be maintained within a fairly close range, namely, between 360 and 390° F. and advantageously between 365 and 385° F. Since the reaction is exothermic, means must be provided to continuously remove the heat of reaction. Conventional means of indirect heat exchange are ordinarily employed to maintain the temperature within a 10° F. range. An alternative means of temperature control involves continuous introduction of water and removal of exothermic heat of reaction by evaporative cooling.

Atmospheric pressure is recommended for the production of the highly soluble, high ester content wax oxidate. In any event, it is necessary to maintain pressure during oxidation below about 30 pounds per square inch absolute since higher pressures result in the production of a less soluble, more acid oxidate.

The final decisive factor in the process of the invention is the air rate at which the oxidation is effected. Air rates of 5 to 20 standard cubic feet of air per pound of deoiled paraffin per hour are prescribed for the production of highly soluble, high ester content oxidates. Air rates of 8 to 15 cubic feet of air per pound of wax are recommended; an air rate of about 10 cubic feet of air per pound of deoiled paraffin per hour has proven particularly advantageous. The air rate is particularly decisive in determining the nature of the wax oxidate because air rates within the prescribed range result in the proper correlation of agitation and contact of reactants to produce a highly soluble, high ester content wax oxidate at the prescribed temperature and pressure conditions. It should be noted that the amount of air passed through the reaction mixture is considerably in excess of that which actually enters into the oxidation reaction.

The air rate also has an effect on the color of the product oxidates. Air rates in the upper portion of the prescribed range result in the production of lighter colored products than do lower air rates.

The process of the invention is illustrated in detail in the following examples wherein deoiled paraffins are oxidized in accordance with the process of the invention.

*Example I*

There was charged to an aluminum reactor provided with heat exchange surface 150 pounds of wax obtained by solvent dewaxing a light paraffin base distillate. The charge wax had the following properties:

| | |
|---|---|
| Gravity, °API | 43.0 |
| Flash, O. Cleve., ° F | 425 |
| Fire, Cleve., ° F | 480 |
| Visc. Say. Univ. at 210° F | 38.4 |
| Color, Lovi. ½″ cell | 5 |
| English melting point, ° F | 128.4 |
| Ash, per cent | None |
| Oil, per cent ASTM | .67 |

Air blowing was initiated as soon as the total charge mixture had been introduced into the reactor. The reaction mixture was rapidly heated to a temperature of about 340° F. by heat exchange in order to initiate the reaction. After initiation of the reaction, as indicated by the evolution of heat, the reaction mixture was allowed to rise to the operating temperature of about 365° F. The reaction vessel was maintained at atmospheric pressure and the air rate was adjusted to 10 standard cubic feet of air per pound of wax per hour. The reaction was continued at the above-mentioned conditions for a period of about 3 hours, at which time the oxidate had reached a Sap. No. of about 77. There was obtained a yield of approximately 95 per cent oxidate on the basis of wax charged; the low molecular weight fractions which were entrained in the exit gases were not included in the determination of this yield. The product was characterized by the following tests:

| | |
|---|---|
| Neut. No | 15.2 |
| Sap. No | 77 |
| Unsap. per cent | 65.4 |
| Ratio: NN/SN | .197 |
| Gravity, °API | 29.2 |
| Flash, O. Cleve., ° F | 405 |
| Fire, Cleve., ° F | 465 |
| Visc. Say. Univ. at 210° F | 61.2 |
| Ash, per cent | .014 |
| Pet. Melting Point, ° F | 124.3 |

*Example II*

A refined wax of the type described in Example I was oxidized with air under similar conditions to those employed in Example I with the exception that the oxidation was continued for a period of six hours at which time the oxidate possessed a Sap. No. of about 116. There was obtained a 90 per cent yield of oxidate on the basis of wax charged. The product oxidate was characterized by the following test.

| | |
|---|---|
| Neut. No | 16.8 |
| Sap. No | 116 |
| Unsap. per cent | 55.2 |
| Ratio: NN/SN | .145 |
| Gravity, API | 21.8 |
| Flash, O. Cleve., ° F | 430 |
| Fire, Cleve., ° F | 485 |
| Visc. Say. Univ. at 210° F | 227 |
| Ash, per cent | .037 |
| Pet. melting point, ° F | 128.6 |

The high ester content coupled with their exceptional solubility in both naphthene base and paraffin base oils makes the wax oxidates produce in accordance with this invention very useful additives for the preparation of specialty lubricants. In general, the highly soluble, high ester content wax oxidates are useful as oiliness agents, emulsifiers and anti-rust agents when compounded in naphthene base or paraffin base oils.

The wax oxidates produced by the process of this invention are miscible with naphthenic and paraffinic mineral oils in all proportions. When wax oxidate is added to mineral oils in concentration of the order of 40 per cent, the oxidates tend to crystallize out of the oil on cooling but clear solutions are reformed upon warming. Lube oil solutions containing these oxidates do not exhibit gummy residues which are encountered when prior art wax oxidates are added to mineral oils.

The non-corrosive nature of mineral oils containing wax oxidates of this invention is illustrated by the fact that a lubricant composition, comprising 10 per cent of the oxidate produced in Example I in a naphthene base oil having a S. U. S. viscosity of 200 at 100° F, gave a negative copper corrosion test after six hours immersion at 212° F.

The improved oiliness imparted to lube oil fractions by incorporation of wax oxidates produced in accordance with this invention is illustrated by the fact that the interfacial tension of a naphthene base oil having a S. U. S. viscosity of 200 at 100° F. was reduced from 35.9 to 13.5 dynes per cm. by the incorporation of 10 per cent of the wax oxidate prepared in Example I.

A further additional advantage of the wax oxidates of this invention is that they possess a bland odor. When oxidates of this invention are incorporated in mineral oils, only the mineral oil odor is noticeable.

Although the invention has been illustrated with the refined wax as a charge material, it is applicable to other waxes containing an oil content less than approximately 5 per cent.

Obviously, many modifications and variations of the invention, as hereinbefore set forth, may be made without departing from the spirit and scope thereof, and therefore, only such limitations should be imposed as are indicated in the appended claims.

I claim:

1. A process for producing a wax oxidate characterized by a high ester content and by excellent solubility in mineral oils, which comprises non-catalytically reacting a deoiled paraffin wax containing less than 5 per cent oil with air at an air feed rate of 5 to 20 cubic feet per pound of paraffin wax per hour, at a temperature between 360 and 390° F. and at a pressure less than 30 p. s. i. a.

2. A process according to claim 1 in which the reaction of wax with air is effected at substantially atmospheric pressure.

3. A process according to claim 1 in which the air feed rate falls between 8 and 15 cubic feet of air per pound of wax per hour.

4. A process according to claim 1 in which the wax is oxidized with air at a temperature between 365 and 385° F.

5. A process according to claim 1 in which the charge material is a paraffin wax which is obtained by solvent dewaxing a distillate oil.

6. A wax oxidate produced by the liquid phase non-catalytic air oxidation of a deoiled paraffin wax at a temperature between 360 and 390° F., at a pressure less than 30 p. s. i. a. and at an air feed rate of 5 to 20 cubic feet per pound of paraffin wax per hour, said oxidate being characterized by a Sap. No. less than about 116, by a Neut. No. to Sap. No. ratio less than 0.25, by an SUV at 210° F. between about 61 and 227, by an unsaponifiable content between about 55 and 65 per cent, and by miscibility with mineral oils.

References Cited in the file of this patent

UNITED STATES PATENTS

| Number | Name | Date |
|---|---|---|
| 2,318,669 | Carr | May 11, 1943 |
| 2,486,454 | Zellner | Nov. 1, 1949 |